(12) United States Patent
Tevs et al.

(10) Patent No.: US 6,697,501 B2
(45) Date of Patent: Feb. 24, 2004

(54) METHOD FOR DETECTING VELOCITY OR DISPLACEMENT OF AN OBJECT OVER A SURFACE BY ANALYZING IMAGES OF THE SURFACE

(75) Inventors: Nickolai R. Tevs, Winnipeg (CA); Dean Michael Weiten, Headingley (CA)

(73) Assignee: Vansco Electronics Ltd., Winnipeg (CA)

( * ) Notice: Subject to any disclaimer, the term of this patent is extended or adjusted under 35 U.S.C. 154(b) by 523 days.

(21) Appl. No.: 09/725,958

(22) Filed: Nov. 30, 2000

(65) Prior Publication Data

US 2002/0064300 A1 May 30, 2002

(51) Int. Cl.$^7$ ................................................. G06K 9/00
(52) U.S. Cl. .................... 382/107; 345/166; 356/614
(58) Field of Search ................. 345/157, 158, 345/163, 164, 165, 166, 175, 214; 356/364, 341, 498; 382/107; 250/336, 335, 363, 368; 340/910, 917, 918, 919, 933

(56) References Cited

U.S. PATENT DOCUMENTS

| | | | | |
|---|---|---|---|---|
| 4,320,975 A | * | 3/1982 | Lilienfeld | 356/364 |
| 4,477,184 A | * | 10/1984 | Endo | 356/141.1 |
| 4,838,685 A | | 6/1989 | Martinez et al. | |
| 4,985,765 A | * | 1/1991 | Fernando | 348/699 |
| 5,166,681 A | * | 11/1992 | Bottesch et al. | 340/933 |
| 5,329,368 A | | 7/1994 | Plotke | |
| 5,361,131 A | * | 11/1994 | Tekemori et al. | 356/499 |
| 6,256,016 B1 | * | 7/2001 | Piot et al. | 345/166 |

\* cited by examiner

*Primary Examiner*—Jayanti K. Patel
*Assistant Examiner*—Abolfazl Tabatabai
(74) *Attorney, Agent, or Firm*—Adrian D. Battison; Michael R. Williams; Ryan W. Dupuis

(57) ABSTRACT

There is described a method for detecting relative displacement between an object such as a slow moving vehicle and an illuminated surface which is normally the ground surface illuminated by an infrared light source so as to provide an output indicating the displacement or a velocity calculated from the displacement. The method includes providing an array of CCD or similar elements each arranged to receive light from a portion of a field of view and to provide an output responsive thereto. The method involves selection of a reference image and repeatedly comparing the reference image of the surface with each successive image by calculating the convolution integral of the signals using a fast fourier transform to obtain a probable displacement value. The reference image is maintained as long as possible until a "Q" factor falls below an acceptable minimum, or until a predetermined time elapses or until a predetermined displacement is measured. The displacement values obtained from the comparisons can be filtered by discarding some values if they are outside an expected range of probable values.

18 Claims, 3 Drawing Sheets

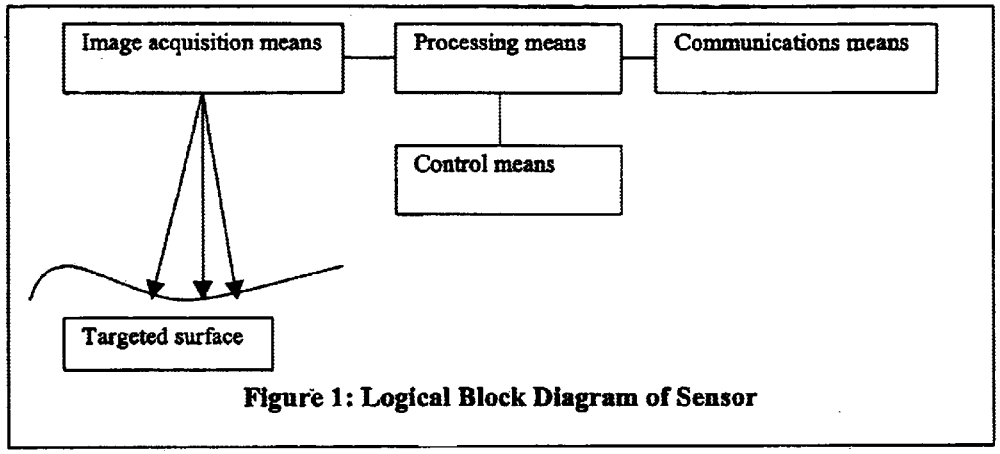
Figure 1: Logical Block Diagram of Sensor
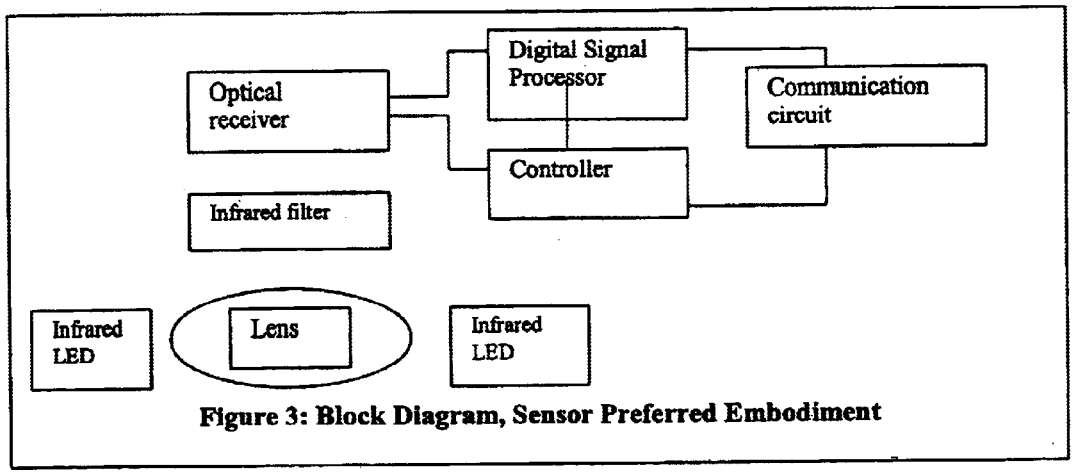
Figure 3: Block Diagram, Sensor Preferred Embodiment

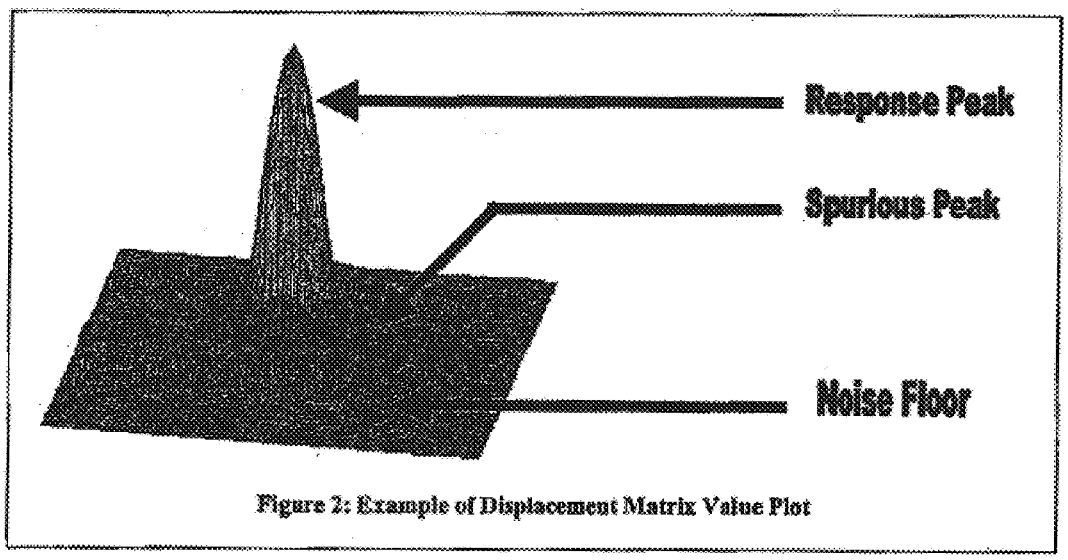
Figure 2: Example of Displacement Matrix Value Plot

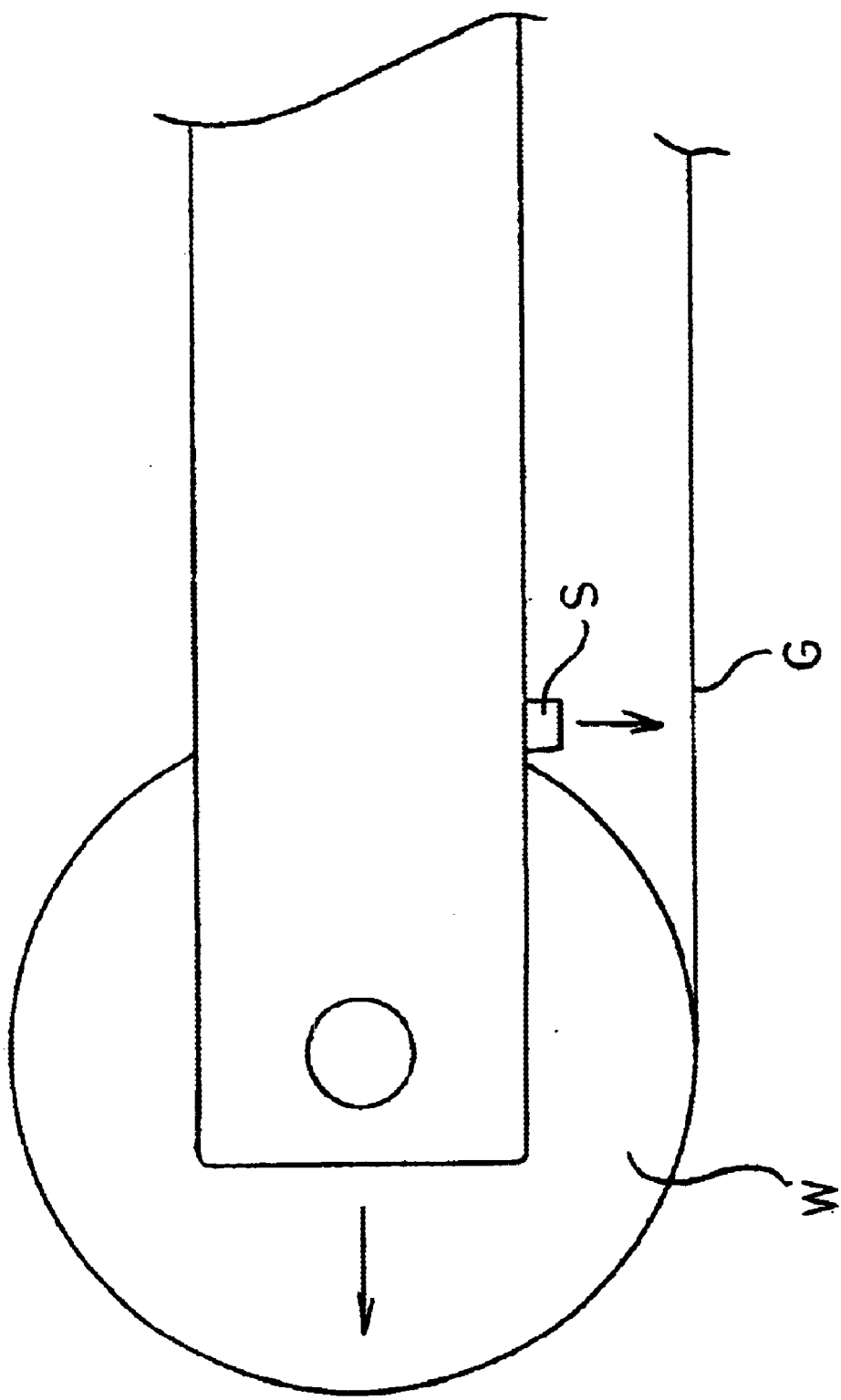

METHOD FOR DETECTING VELOCITY OR DISPLACEMENT OF AN OBJECT OVER A SURFACE BY ANALYZING IMAGES OF THE SURFACE

This invention relates to a method of detecting velocity or displacement of a moving object.

BACKGROUND OF THE INVENTION

Detecting of the velocity of a moving object and primarily a slow moving vehicle such as an agricultural or other ground working vehicle can be carried out using many techniques.

Physical contact with the ground by a wheel or the like has the disadvantage that slip caused by ground conditions can raise significant inaccuracies.

Radar systems use emissions which are problematic and are ineffective at low speeds close to stationary so that it is not possible to discern very small movements and to distinguish those from no movement.

GPS systems are insufficiently accurate to determine small movements and also signals can be lost at particular locations due to interfering objects.

SUMMARY OF THE INVENTION

It is one object of the present invention therefore to provide an improved method for detecting velocity and/or displacement of an object relative to a surface.

According to one aspect of the invention there is provided a method for detecting relative displacement between an object and an illuminated surface comprising:

providing an array of detecting elements each arranged to receive light from a portion of a field of view and to provide an output responsive thereto;

locating the array adjacent the surface during said displacement such that the field of view is moved across the surface by the displacement;

repeatedly acquiring the output signals of the detecting elements to generate a plurality of sequential signals each corresponding to a respective image of the surface with each successive image being displaced from the previous image by a distance proportional to an amount of said displacement;

selecting one of the sequential signals as a reference signal;

processing the sequential signals to effect a comparison of said reference signal with at least two subsequent sequential signals to generate for each subsequent sequential signal a value indicative of displacement between the image corresponding to the reference signal and the subsequent images corresponding to said at least two subsequent sequential signals;

and analyzing the values to determine a final value indicative of the displacement.

It will be appreciated that the output from the method may be a displacement, that is a particular distance moved, or the same value over a particular time period may be used to calculate an instantaneous value of velocity.

The method defined above may be used to detect movement of the surface or the sensor and in many uses, it does not matter which is moving relative to the other. However one primary use of the method is in detection of movement of slow moving vehicles where the surface is the ground and the sensor elements are mounted at a suitable location on the vehicle.

Preferably the reference signal is maintained for said comparison of each image in turn for as long as possible until a predetermined parameter is reached which indicates that the reference frame should no longer be maintained.

In one arrangement, the reference signal is maintained until a meaningful comparison can no longer be made.

In one preferred arrangement, the method includes calculating for each comparison a Q factor indicative of the strength of the displacement value relative to other values wherein the reference signal is maintained for said comparison until the Q factor falls below a predetermined minimum value.

In this arrangement, the reference signal may be changed after a predetermined time period even if the Q factor remains above the predetermined minimum value, to realign the device with subtle changes in the reference signal.

Also the reference signal can be changed after a predetermined displacement even if the Q factor remains above the predetermined minimum value. This will provide more accuracy when there are many symmetries in the reference signal, keeping the Q factor artificially high.

In most cases, the reference signal is changed to that subsequent sequential signal which is being compared when the predetermined parameter, such as the Q factor reaching the minimum acceptable value, is reached.

In a preferred arrangement, the step of analyzing the values includes discarding one or more of the values corresponding to at least one of the subsequent sequential signals. This is done by detecting those values which are physically impossible or statistically improbable based upon data up to date. In such a case, the signal is discarded and the comparisons continued on the basis of the next signal.

While ambient light can be used in some cases, it is preferred to effect separate illumination of the surface to maintain a constant level of illumination. Infrared light is preferred to avoid the variations in ambient illumination which can occur in outside measurement situations.

Preferably the array is two dimensional for detecting displacement in two directions but if movement is limited to a single direction, the array can be arranged along a single line.

Preferably the step of processing includes calculating the convolution integral of the signals, which is a known technique for comparing two digital images and for calculating the displacement therebetween.

While other calculation techniques are available, one preferred arrangement uses a Fast Fourier Transform technique to calculate the convolution integral.

Where the method is used for detecting movement of a slow moving vehicle such as an earth working vehicle, the array is mounted on the vehicle behind one wheel so as to obtain images of a portion of the ground which has been compressed by the wheel. This reduces changes in the image caused by moving vegetation or other objects since those objects are likely rendered stationary by the compression.

BRIEF DESCRIPTION OF THE DRAWINGS

One embodiment of the invention will now be described in conjunction with the accompanying drawings in which:

FIG. 1 shows a logical block diagram of the sensor.

FIG. 2 is a surface plot of a matrix showing the relationship between the peak and other "spurious" peaks, and between this peak and the noise floor which give an indication of the quality of the measurement.

FIG. 3 is a block diagram of the preferred embodiment of the displacement/velocity sensor.

FIG. 4 is a schematic illustration of the mounting of the sensor on a vehicle.

In the drawings like characters of reference indicate corresponding parts in the different figures.

DETAILED DESCRIPTION OF PREFERRED EMBODIMENTS

The sensor is intended for installation on an object, to measure displacement and/or velocity of that object, with respect to a target surface that can be viewed by the image acquisition means. The type and format of the targeted surface may or may not be known beforehand. In the case of a vehicle as shown in FIG. 4, the surface is the ground surface which can vary independent of movement caused by changes in the surface such as shifting soil, moving vegetation or wind blown objects.

The image acquisition means observes the targeted surface and creates an image signal, which is sent to the processing means. The processing means performs an analysis of the image signal, giving an output for displacement and velocity of the sensor with respect to the surface. This output information is provided to the communications means for display or communications to other devices. The control means monitors operation of the processing means, and provides control signals to maintain proper operation.

Various parameters of the image acquisition means affect its measurements. Lens parameters and the distance between the sensor and the ground surface affect the relationship between distances on the targeted surface and the corresponding distances in the image formed on the image acquisition means.

If a digital image sensor is used as the image acquisition means, then this relationship is expressed in a target surface distance per pixel (e.g. 1 mm on the targeted surface per pixel on the image sensor). This depends upon the geometry of the system and may be altered by the lens arrangement if required.

For any particular application of the sensor, the optimal relationship between distances on the targeted surface and on the image acquisition means may be established such that the sensor is most sensitive to features in the scene, and computational requirements are minimized.

The type and complexity of the image acquisition means affects the measurements that can be performed with the system. For instance, if a sensor is configured in a narrow line (e.g. a digital line or one dimensional sensor), then only motion along a single axis can be measured.

An infrared light source illuminating the surface and infrared filter to discard ambient light may optionally be added to the system to improve the response time of the sensor and increase immunity against ambient light variations.

The convolution integral of two images gives the spatial displacement between them. If a convolution is performed on the two-dimensional digital images, the result is a matrix of values, each value corresponding to the probability of a certain displacement between the images. The displacement between the images can be determined based on these numbers.

There are different methods to calculate the convolution integral. The most popular and efficient method uses software processing of the Fast Fourier Transform (FFT), but other methods could be effective in other particular applications.

The convolution of two signals is equivalent to the inverse Fast Fourier Transform (FFT) of the matrix multiplication of the FFTs of the signals. If "$\otimes$" denotes convolution, "FFT(x)" denotes a fast Fourier transform of "x", and "$FFT^{-1}(x)$" denotes an inverse FFT of "x", then:

$$f_1 \otimes f_2 = FFT^{-1}(FFT(f_1) \times FFT(f_2))$$

A displacement matrix is calculated by doing a convolution of the images. An FFT is performed on each image, then the resultant FFT matrices are multiplied together, and an inverse FFT performed on the resultant product matrix.

Generally, this displacement matrix will have apparently random low-level values in most locations (the "noise floor"), and peak values of various levels. This matrix is examined for its maximum peak, the location of which corresponds to the best estimate of the displacement between the images. The relationship between this peak and other "spurious" peaks, and between this peak and the noise floor, give an indication of the quality of the measurement. An example of such a matrix is shown in FIG. 2, as a surface plot.

An aggregate measurement of quality called "quality factor" ("Q") can be calculated on the entire matrix. This Q value can be used to determine when to change the reference frame from which displacements are measured. The quality factor may be calculated as:

$$Q(dB) \approx A_{1st\ highest\ peak}(dB) - [A_{2nd\ highest\ peak}(dB) - A_{Minimum}(dB)]$$

The quality factor gives an indication of confidence in the displacement measurement of the algorithm. Low quality factor may be reported through the communications means to give a warning of low accuracy, improper use of the sensor, or of required maintenance (e.g. cleaning of the lens). A long duration of low quality factor may be reported through the communications means to indicate that measurements results are not reliable.

The first image in a sequence of images becomes a reference image. The displacement matrix is calculated for each subsequent image, relative to the reference image. The reference image is replaced with a new, subsequent image, when a replacement criteria is met. Replacement criteria may include a certain percentage or amount reduction of the Q, or a calculated displacement of greater than a certain amount of the image size. As displacement moves to a large fraction of the size of the image, uncertainty is introduced in the measurement.

The Q of the convolution of the reference image to itself gives an indication of the quality of the scene for the calculation of displacement. This value for Q may be the basis for the threshold of reference to subsequent image Q for replacement of the reference image.

The displacement calculation results may be affected by different ambient factors such as mechanical vibration, mechanical shock, rotation of the vehicle, moving particles (e.g. dust, leaves, or animals) or shadow in the field of view of the sensor. Filtering is implemented to improve accuracy of the measurement. Filtering techniques include a pass/reject of the calculated displacement, based on knowledge of allowed acceleration of the object from its physical characteristics. For example, a running average may be kept of the displacement values over time, and displacement values far away from this average (e.g. less than half or more than double) are not allowed. Note that, since the reference is maintained, this does not introduce errors.

The sensor reports the displacement that it has calculated through the communications means. In some applications, this may be a viewable display. It may also be a communicated digital or analog signal to another device, external or internal to its own package.

The operation is monitored and directed by the control means. This includes any requirement to correct an upset (e.g. a "reset") due to electrical interference or poor power quality. It may also participate in the calculations, and in the reference image selection process.

In this application, the sensor is installed on a vehicle as shown in FIG. 4 to measure the two-dimensional displacement and velocity with respect to ground.

The optical receiver is a monochrome CMOS or CCD matrix array and acquires images of the ground surface under the vehicle and converts them into digital form. The image is created by the lens on the sensor matrix array. The lens characteristics determine the spatial resolution of the sensor.

An infrared filter is used to reduce the effect of widely varying levels of ambient light on the measurement. Infrared LEDs are used to illuminate the scene that the optical receiver views. The output intensity of the infrared LEDs may be varied to provide optimal exposure on the optical receiver.

The images acquired by the optical receiver are provided in digital form to the Digital Signal Processor (DSP) for processing. The DSP processes the images, determines the displacement and filters the calculated displacement values that occurred during the time period when the images were taken.

A controller processor is used to communicate the displacement information to the user (perhaps through a display unit), and to other devices.

A communication circuit provides the means by which the communications to other devices is accomplished. It is in the form of a "controller area network" (CAN) bus, wherein devices on the vehicle may exchange data bi-directionally.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method for detecting relative displacement between an object and an illuminated surface comprising:
   providing an array of detecting elements each arranged to receive light from a portion of a field of view and to provide an output responsive thereto;
   locating the array adjacent the surface during said displacement such that the field of view is moved across the surface by the displacement;
   repeatedly acquiring the output signals of the detecting elements to generate a plurality of sequential signals each corresponding to a respective image of the surface with each successive image being displaced from the previous image by a distance proportional to an amount of said displacement;
   selecting one of the sequential signals as a reference signal;
   processing the sequential signals to effect a comparison of said reference signal with at least two subsequent sequential signals to generate for each subsequent sequential signal a value indicative of displacement between the image corresponding to the reference signal and the subsequent images corresponding to said at least two subsequent sequential signals;
   and analyzing the values to determine a final value indicative of the displacement.

2. The method according to claim 1 wherein the reference signal is maintained for said comparison for as long as possible until a predetermined parameter is reached.

3. The method according to claim 2 wherein the reference signal is maintained until a comparison can no longer be made.

4. The method according to claim 2 including calculating for each comparison a Q factor indicative of the strength of the displacement value relative to other values wherein the reference signal is maintained for said comparison until the Q factor falls below a predetermined minimum value.

5. The method according to claim 4 wherein the reference signal is changed after a predetermined time period even if the Q factor remains above the predetermined minimum value.

6. The method according to claim 2 wherein the reference signal is changed after a predetermined time period.

7. The method according to claim 4 wherein the reference signal is changed after a predetermined displacement even if the Q factor remains above the predetermined minimum value.

8. The method according to claim 2 wherein the reference signal is changed after a predetermined displacement.

9. The method according to claim 2 wherein the reference signal is changed to that subsequent sequential signal which is being compared when the predetermined parameter is reached.

10. The method according to claim 1 wherein the step of analyzing the values includes discarding the value corresponding to at least one of the subsequent sequential signals.

11. The method according to claim 10 wherein the value is discarded if it falls outside possible or probable values based on physical knowledge of the system and statistical history of the values.

12. The method according to claim 1 including illuminating the surface.

13. The method according to claim 1 including illuminating the surface by infrared light.

14. The method according to claim 1 wherein the array is two dimensional for detecting displacement in two directions.

15. The method according to claim 1 wherein the step of processing includes calculating the convolution integral.

16. The method according to claim 15 wherein the convolution integral is calculated by a Fast Fourier Transform technique.

17. The method according to claim 1 wherein the array is mounted on a vehicle and wherein the surface is the ground.

18. The method according to claim 17 wherein the array is mounted on the vehicle behind one wheel so as to obtain images of a portion of the ground which has been compressed by the wheel.

* * * * *